(12) United States Patent
Chawla et al.

(10) Patent No.: US 7,945,619 B1
(45) Date of Patent: *May 17, 2011

(54) METHODS AND APPARATUSES FOR REPORTING BASED ON ATTENTION OF A USER DURING A COLLABORATION SESSION

(76) Inventors: Jitendra Chawla, Union City, CA (US); David Knight, Belmont, CA (US); Edward Wong, Fremont, CA (US); Manish Kumar, Sunnyvale, CA (US)

( * ) Notice: Subject to any disclaimer, the term of this patent is extended or adjusted under 35 U.S.C. 154(b) by 962 days.

This patent is subject to a terminal disclaimer.

(21) Appl. No.: 11/172,184

(22) Filed: Jun. 29, 2005

Related U.S. Application Data

(60) Provisional application No. 60/872,400, filed on Sep. 20, 2004.

(51) Int. Cl.
*G06F 15/16* (2006.01)
(52) U.S. Cl. .................. 709/204; 709/205; 348/14.08; 348/14.09; 370/260; 715/753; 715/758
(58) Field of Classification Search .................. 709/205, 709/224, 204
See application file for complete search history.

(56) References Cited

U.S. PATENT DOCUMENTS

| | | | | |
|---|---|---|---|---|
| 6,002,397 A * | 12/1999 | Jaaskelainen, Jr. | ............ | 715/805 |
| 6,148,328 A * | 11/2000 | Cuomo et al. | ................ | 709/204 |
| 6,301,246 B1 | 10/2001 | Shaffer et al. | | |
| 6,519,639 B1 * | 2/2003 | Glasser et al. | ................ | 709/224 |
| 6,631,412 B1 | 10/2003 | Glasser et al. | | |
| 6,691,162 B1 * | 2/2004 | Wick | ............................ | 709/224 |
| 6,782,350 B1 | 8/2004 | Burnley et al. | | |
| 6,917,587 B1 | 7/2005 | Sarkar et al. | | |
| 7,139,797 B1 * | 11/2006 | Yoakum et al. | ................ | 709/204 |
| 7,373,608 B2 | 5/2008 | Lentz | | |
| 7,386,473 B2 | 6/2008 | Blumenau | | |
| 2002/0049786 A1 * | 4/2002 | Bibliowicz et al. | ........... | 707/511 |
| 2002/0138624 A1 | 9/2002 | Esenther | | |
| 2002/0143876 A1 * | 10/2002 | Boyer et al. | .................. | 709/205 |
| 2002/0143916 A1 * | 10/2002 | Mendiola et al. | .............. | 709/223 |
| 2003/0052911 A1 * | 3/2003 | Cohen-solal | .................. | 345/738 |
| 2003/0055897 A1 * | 3/2003 | Brown et al. | ................. | 709/205 |
| 2003/0101219 A1 | 5/2003 | Kondo et al. | | |
| 2004/0128359 A1 | 7/2004 | Horvitz et al. | | |
| 2005/0055412 A1 | 3/2005 | Kaminsky et al. | | |
| 2005/0099492 A1 | 5/2005 | Orr | | |
| 2007/0100393 A1 | 5/2007 | Bagley et al. | | |

OTHER PUBLICATIONS

PCT Notification of Transmittal of The International Search Report and the Written Opinion of the International Searching Authority or The Declaration for PCT Counterpart Application No. PCT/US06/24857 Containing International Search Report, 7 pgs. (Mar. 19, 2007).

PCT Notification of Transmittal of International Preliminary Examination Report for PCT Counterpart Application No. PCT/US06/24857 Containing International Preliminary Examination, 6 pgs. (Jan. 17, 2008).

* cited by examiner

*Primary Examiner* — Alina N Boutah
*Assistant Examiner* — Adam Cooney
(74) *Attorney, Agent, or Firm* — Cesari and McKenna, LLP

(57) ABSTRACT

In one embodiment, the methods and apparatuses view content that corresponds with a particular time period during a collaboration session; identify a plurality of attendee devices participating in the collaboration session at the particular time period; determine an attention status of each attendee device at the particular time period; and display the attention status of the plurality of attendee devices at the particular time period.

18 Claims, 10 Drawing Sheets

METHODS AND APPARATUSES FOR REPORTING BASED ON ATTENTION OF A USER DURING A COLLABORATION SESSION

RELATED APPLICATION

The present invention is related to, and claims the benefit of U.S. Provisional Patent Application No. 60/872,400, filed on Sep. 20, 2004, entitled, "Attention Indicator For Use In A Web Conference," by Jitendra Chawla.

FIELD OF INVENTION

The present invention relates generally to monitoring attention of a user and, more particularly, to reporting based on attention of a user during a collaboration session.

BACKGROUND

There has been an increased use in collaboration sessions that are Internet or web-based to communicate with employees, vendors, and clients. During these collaboration sessions, information is typically exchanged between multiple participants. This exchanged information may include audio, graphical, and/or textual information. Often times the ongoing effectiveness of the collaboration session depends on the participants paying attention in the collaboration session. There are many reasons as to why the participant fails to pay attention in the collaboration session. Several examples include exchanged information that is poorly designed, participants falling behind during the collaboration session, lack of interest on the part of the participant, and technical difficulties that prevent the participant from following the collaboration session.

SUMMARY

In one embodiment, the methods and apparatuses view content that corresponds with a particular time period during a collaboration session; identify a plurality of attendee devices participating in the collaboration session at the particular time period; determine an attention status of each attendee device at the particular time period; and display the attention status of the plurality of attendee devices at the particular time period.

BRIEF DESCRIPTION OF THE DRAWINGS

The accompanying drawings, which are incorporated in and constitute a part of this specification, illustrate and explain one embodiment of the methods and apparatuses for reporting based on attention of a user during a collaboration session. In the drawings.

DETAILED DESCRIPTION

The following detailed description of the methods and apparatuses for reporting based on attention of a user during a collaboration session refers to the accompanying drawings. The detailed description is not intended to limit the methods and apparatuses for reporting based on attention of a user during a collaboration session. Instead, the scope of the methods and apparatuses for reporting based on attention of a user during a collaboration session is defined by the appended claims and equivalents. Those skilled in the art will recognize that many other implementations are possible, consistent with the present invention.

References to a "device" include a device utilized by a user such as a desktop computer, a portable computer, a personal digital assistant, a video phone, a landline telephone, a cellular telephone, and a device capable of receiving/transmitting an electronic signal.

References to a desktop are directed to an entire portion of a display area of a corresponding device.

References to a collaboration session include a plurality of devices that are configured to view content submitted by one of the devices.

References to a participant device include devices that are participating in the collaboration session.

References to a presenter device include a device that is participant and shares content shared with other participants.

References to an attendee device include a device that is a participant and receives content shared by another participant device. The attendees are capable of view content that is offered by the presenter device. In some instances, the attendee devices are capable of modifying the content shared by the presenter device.

In one embodiment, the methods and apparatuses for reporting based on attention of a user during a collaboration session detects the attention of an attendee device during a collaboration session. In one embodiment, different attributes of the attendee device that reflect the attention of the user of the attendee device are detected, recorded, and analyzed to determine whether the user of the attendee device is paying attention to the content associated with the collaboration session. In one embodiment, by indicating the attention of the user of the attendee device, the attendee device may be prompted to pay attention. Further, the presenter device may be alerted to the attention status of the attendee devices. Additionally, the attention status for each of the attendee devices may be correlated to the content presented during the collaboration session at predetermined times such that the attention of the attendee devices may be determined at any point during the collaboration session.

Figure 1:
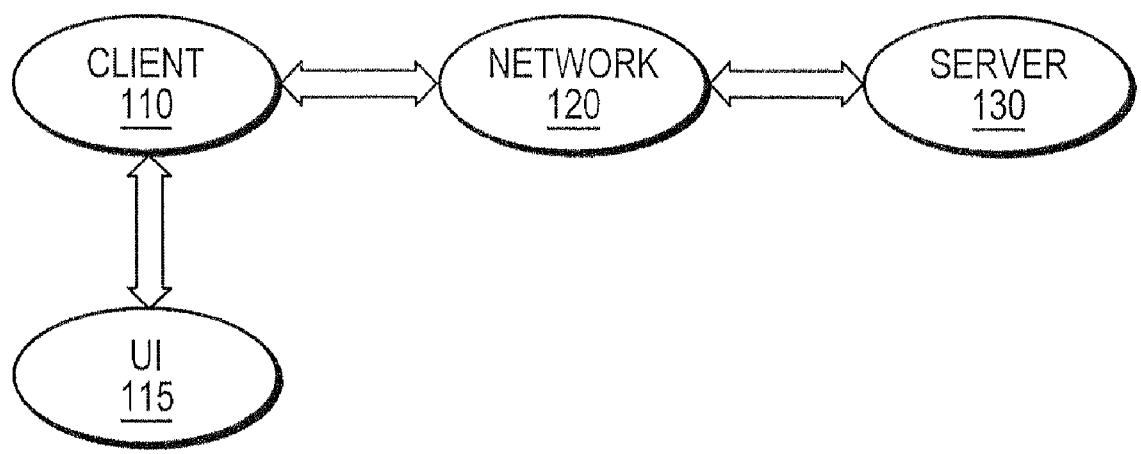
FIG. 1 is a diagram illustrating an environment within which the methods and apparatuses for reporting based on attention of a user during a collaboration session are implemented.

FIG. 1 is a diagram illustrating an environment within which the methods and apparatuses for reporting based on attention of a user during a collaboration session are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces) in the same housing such as a personal digital assistant. In other embodiments, one or more user interface 115 components (e.g., a keyboard, a pointing device such as a mouse, a trackball, a microphone, a speaker, a display, a camera) are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of reporting based on attention of a user during a collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
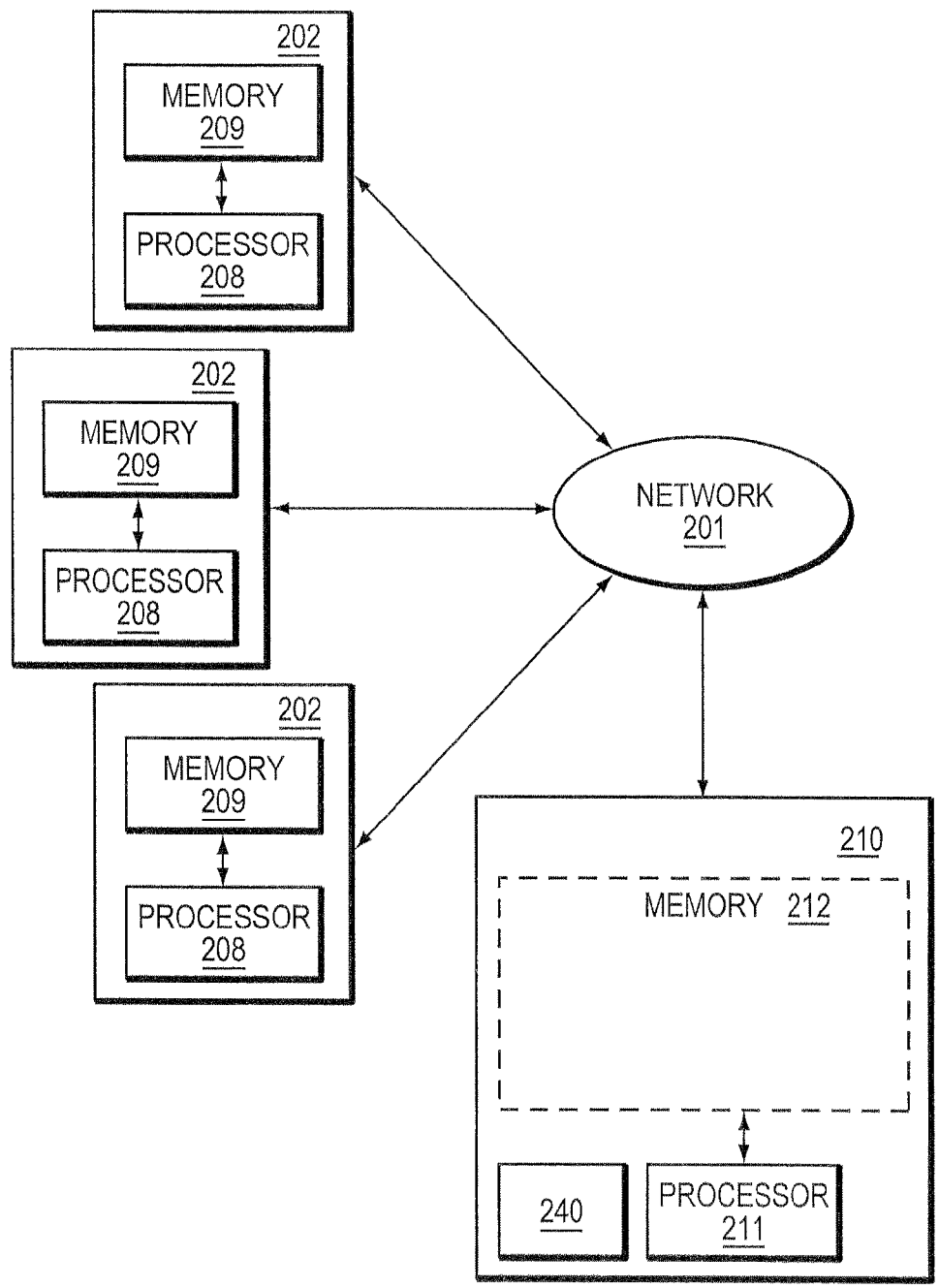
FIG. 2 is a simplified block diagram illustrating one embodiment in which the methods and apparatuses for reporting based on attention of a user during a collaboration session are implemented.

FIG. 2 is a simplified diagram illustrating an exemplary architecture in which the methods and apparatuses for reporting based on attention of a user during a collaboration session are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 210 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for reporting based on attention of a user during a collaboration session. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on reporting based on attention of a user during a collaboration session as determined using embodiments described below.

Figure 3:
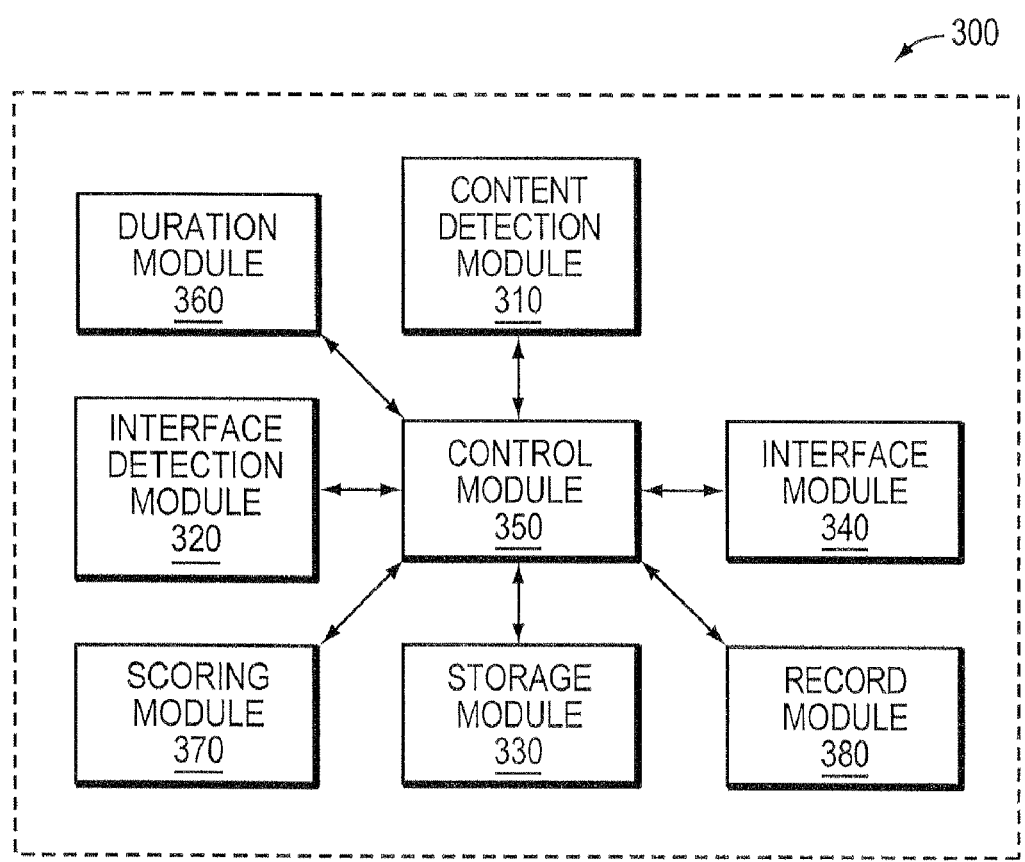
FIG. 3 is a simplified block diagram illustrating a system, consistent with one embodiment of the methods and apparatuses reporting based on attention of a user during a collaboration session.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a content detection module 310, an interface detection module 320, a storage module 330, an interface module 340, a control module 350, a duration module 360, a scoring module 370, and a record module 380.

In one embodiment, the control module 350 communicates with the content detection module 310, the interface detection module 320, the storage module 330, the interface module 340, the duration module 360, the scoring module 370, and the record module 380. In one embodiment, the control module 350 coordinates tasks, requests, and communications between the content detection module 310, the interface detection module 320, the storage module 330, the interface module 340, the duration module 360, the scoring module 370, and the record module 380.

In one embodiment, the content detection module 310 detects content that is utilized by the user in connection with the device. In one embodiment, the content is utilized in connection with multiple devices within a collaboration session between multiple parties. For example, the collaboration session may include a data conference or a video conference through a network, a phone line, and/or the Internet.

In one embodiment, the content is a document utilized within a collaboration session. In another embodiment, the content is audio visual media that is utilized within a collaboration session.

In one embodiment, the content detection module 310 detects the location of the content within each device. For example, the content detection module 310 is capable of detecting whether the content is currently being displayed on the device. Further, when there are multiple pieces of content on a particular device, the content detection module 310 is capable of detecting whether the content that is the subject of the collaboration session is currently the priority content and shown on the display relative to the other pieces of content. For example, the subject of the collaboration session is currently on top and shown on the display relative to other content.

In another embodiment, the content detection module 310 detects the size of the content that is being displayed on the device. For example, the content detection module 310 is capable of determining the size of the window that displays the content being utilized within the collaboration session.

In yet another embodiment, the content detection module 310 detects the displayed location of the content that is the subject of the collaboration session. For example, centrally positioned locations on a display device may be considered better locations for a user to view the content that is the subject of the collaboration session. Similarly, locations that are on the periphery of the display device may be considered less desirable.

In one embodiment, the interface detection module 320 monitors input from various interface devices connected to devices that are participating in the collaboration session. These various interface devices include a keyboard, a pointing device, a microphone, a telephone, a video camera, and the like.

In one embodiment, the interface detection module 320 detects when the cursor is moved within the device participating in the collaboration session. In another embodiment, the interface detection module 320 monitors the voice transmissions originating from the device participating in the collaboration session. In yet another embodiment, the interface detection module 320 detects any activity by the device participating in the collaboration session.

For example, in one embodiment, the presence of input from the device participating in a collaboration session indicates that the device is being actively utilized and that the user may be viewing the device.

In one embodiment, the storage module 330 stores a record including a list of attributes associated with the each device participating in a collaboration session. An exemplary list of attributes is shown in a record 400 within FIG. 4.

In one embodiment, the interface module 340 receives a signal from one of the electronic devices 110. In one embodiment, the electronic devices 110 are participating in a collaboration session. In another embodiment, the interface module 340 delivers a signal to one of the electronic devices 110.

In one embodiment, the duration module 360 monitors the duration of the interaction of the devices participating in the collaboration session. For example, if one of the devices has the content located in a prominent location, then the duration module 360 monitors the length of time that the content is shown in the prominent location. In another example, the duration module 360 also monitors the duration of voice transmissions and/or use of other interface devices.

In another embodiment, the duration module 360 also monitors the frequency of interaction of the devices participating in the collaboration session. If the device participating in the collaboration session is frequently being utilized during the duration of the collaboration session, there is a higher chance that a user of the device is viewing the device during the collaboration session.

In one embodiment, the scoring module 370 receives information from the content detection module 310, the interface detection module 320, and the duration module 360. In one embodiment, the scoring module 370 determines the level of participation of the user of each device participating in the collaboration session is considered active. In one embodiment, if the level of participation exceeds an arbitrary threshold, then the device is considered "active". Similarly, if the level of participation is below an arbitrary threshold, then the device is considered "inactive".

In one embodiment, the level of participation among each device is utilized to determine the level of participation for all participants within the collaboration session.

In one embodiment, the record module 380 stores the collaboration session. In one embodiment, the record module 380 stores the content that is presented during the collaboration session. In another embodiment, the record module 380 stores the annotations and comments produced by the participants of the collaboration session. In yet another embodiment, the record module 380 the activity levels of each of the devices participating in the collaboration session.

In another embodiment, the record module 380 stores the participation values for each device participating in the collaboration session and corresponding content that is the subject of the collaboration session. In one embodiment, the participation values for each device are stored for a particular moment that corresponds with the same moment during the collaboration session.

The system 300 in FIG. 3 is shown for exemplary purposes and is merely one embodiment of the methods and apparatuses for reporting based on attention of a user during a collaboration session. Additional modules may be added to the system 300 without departing from the scope of the methods and apparatuses for reporting based on attention of a user during a collaboration session. Similarly, modules may be combined or deleted without departing from the scope of the methods and apparatuses for reporting based on attention of a user during a collaboration session.

Figure 4:
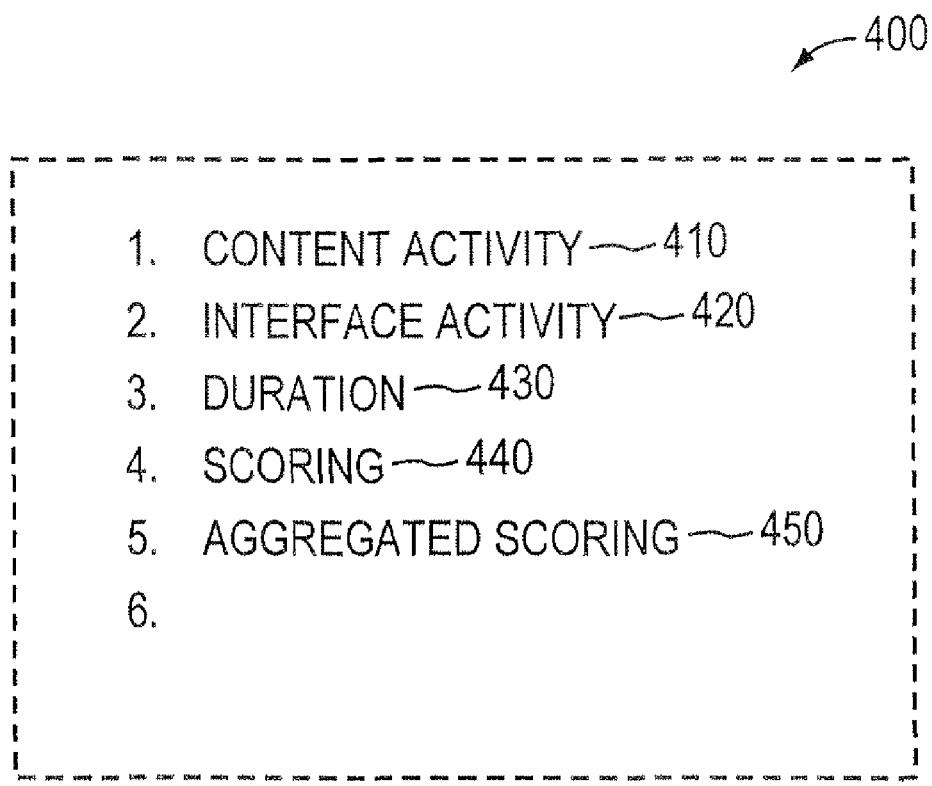
FIG. 4 is an exemplary record for use with the methods and apparatuses for reporting based on attention of a user during a collaboration session.

FIG. 4 illustrates an exemplary record 400 for use with the methods and apparatuses for reporting based on attention of a user during a collaboration session. In one embodiment, the record 400 illustrates an exemplary record associated with the participation of a particular device during a collaboration session.

In one embodiment, there are multiple records such that each record 400 is associated with a particular device. Further, each device corresponds with multiple records wherein each record 400 for a particular device corresponds to a particular collaboration session.

In one embodiment, the record 400 includes a content activity field 410, an interface activity field 420, a duration field 430, a scoring field 440, and an aggregated scoring field 450. In one embodiment, the record 400 resides within the storage module 330. In one embodiment, the record 400 describes a attributes detected through the system 300.

In one embodiment, the content activity field 410 includes information related to the content activity associated with the particular device during the collaboration session. In one embodiment, the content activity field 410 indicates a time stamp when the content activity is detected through the content detection module 310. For example, a time stamp that describes when the content that is the subject of the collaboration session is pushed to the background is recorded and stored within the content activity field 410.

In one embodiment, the interface activity field 420 includes information related to the interface activity associated with the particular device during the collaboration session. In one embodiment, the content activity field 420 indicates a time stamp when the interface activity is detected through the content detection module 320. For example, a time stamp that describes when the cursor is utilized by a user of the particular device during the collaboration session is recorded and stored within the interface activity field 420.

In one embodiment, the duration field 430 includes the length of time that corresponds to activity attributed from the content and/or the interface device associated with the particular device during the collaboration session. In one embodiment, the duration field 430 receives information through the duration module 360.

In one embodiment, the scoring field 440 includes a score that represents a rating of both the duration and the activity level of the particular device during the collaboration session. In one embodiment, the scoring field 440 receives information through the scoring module 370.

In one embodiment, the aggregated scoring field 450 includes a score that represents an overall rating of all the devices during the collaboration session. In one embodiment, the overall rating is based on both the duration and the activity level of all the devices during the collaboration session. In one embodiment, the aggregated scoring field 450 receives information through the scoring module 370.

The flow diagrams as depicted in FIGS. 5, 6, 7 and 8 are one embodiment of the methods and apparatuses for reporting based on attention of a user during a collaboration session. The blocks within the flow diagrams can be performed in a different sequence without departing from the spirit of the methods and apparatuses for reporting based on attention of a user during a collaboration session. Further, blocks can be deleted, added, or combined without departing from the spirit of the methods and apparatuses for reporting based on attention of a user during a collaboration session.

Figure 5:
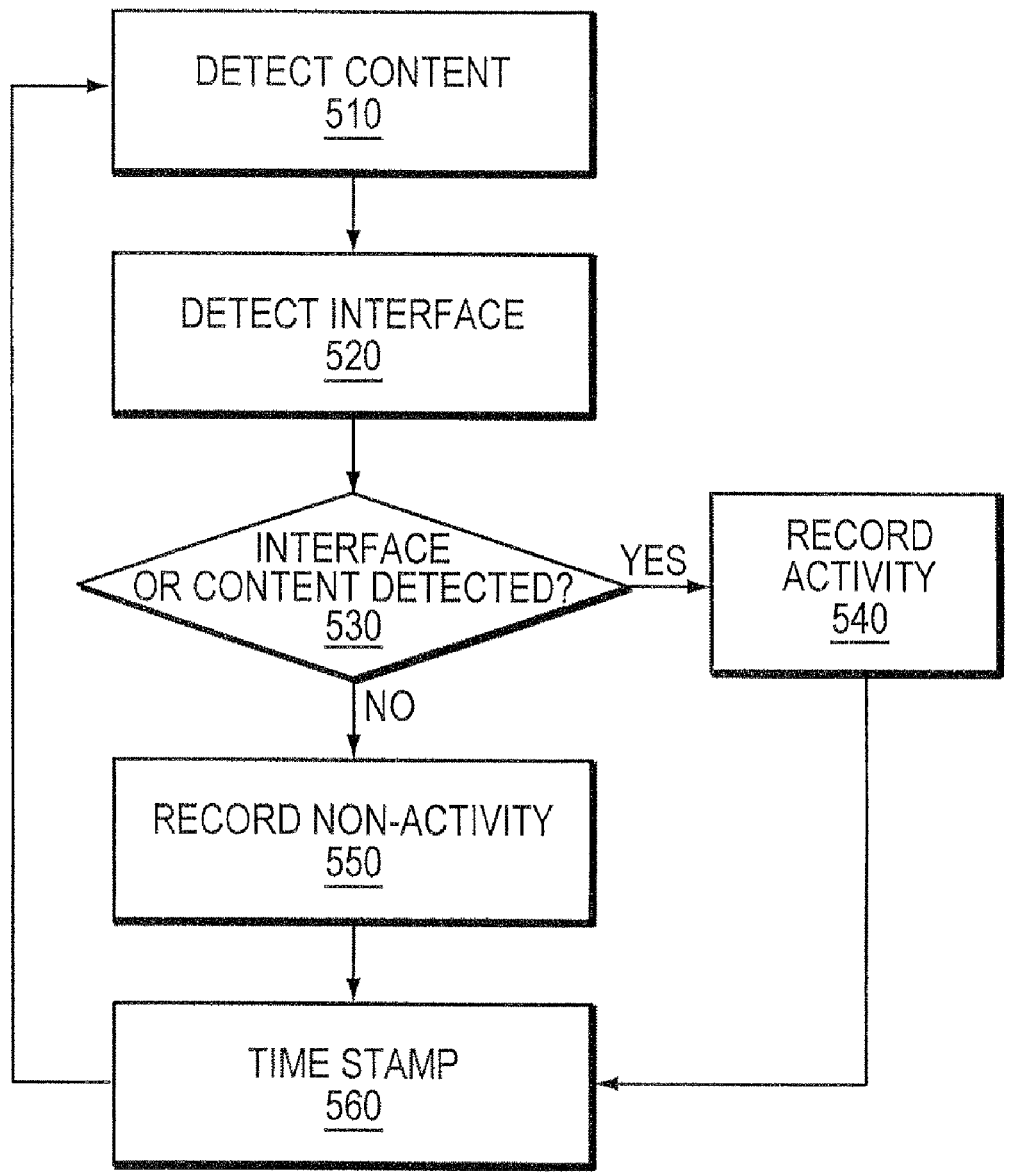
FIG. 5 is a flow diagram consistent with one embodiment of the methods and apparatuses for reporting based on attention of a user during a collaboration session.

The flow diagram in FIG. 5 illustrates capturing activities occurring on a device that is participating on a collaboration session according to one embodiment of the invention.

In Block 510, the content is detected. In one embodiment, the content is one of the items utilized within the collaboration session. In one embodiment, the content is detected through the content detection module 310. For example, the manner in which the content is displayed on the device that is participating in the collaboration session is detected. The manner in which the content is displayed includes the size of the content being displayed, the priority of the content (whether the content is displayed on the top-most window), and/or the position of the content within the display area.

In Block 520, the interface is detected. In one embodiment, the interface input is detected from one of the devices participating in the collaboration session. In one embodiment, the interface input is detected through the interface detection module 320. For example, movement of the cursor or selection of items by devices during the collaboration session is detected.

In Block 530, if interface input is detected, then the input activity is recorded within the Block 540. If no interface input is detected, then the absence of input activity is recorded within the Block 550.

In Block 530, if a change in the display of the content is detected, then the content activity is recorded within the Block 540. If no change in the display of the content is detected, then the absence of content activity is recorded within the Block 550.

In Block 560, a time stamp is applied to either the recordation of either activity or absence of activity. In one embodiment, the time stamp is accorded a real time of day such as 1:30 PM. In another embodiment, the time stamp is accorded a time relative to the collaboration session such as 2 minutes 15 seconds into the collaboration session. In either embodiment, the granularity of the time stamp may be adjustable. For example, the time stamp can occur every minute, every second, or every fraction of a second depending on the collaboration session.

In one embodiment, the activity information that arises from the content detection module 310 and the interface detection module 320 are recorded within a record 400 of the storage module 330.

Figure 6:
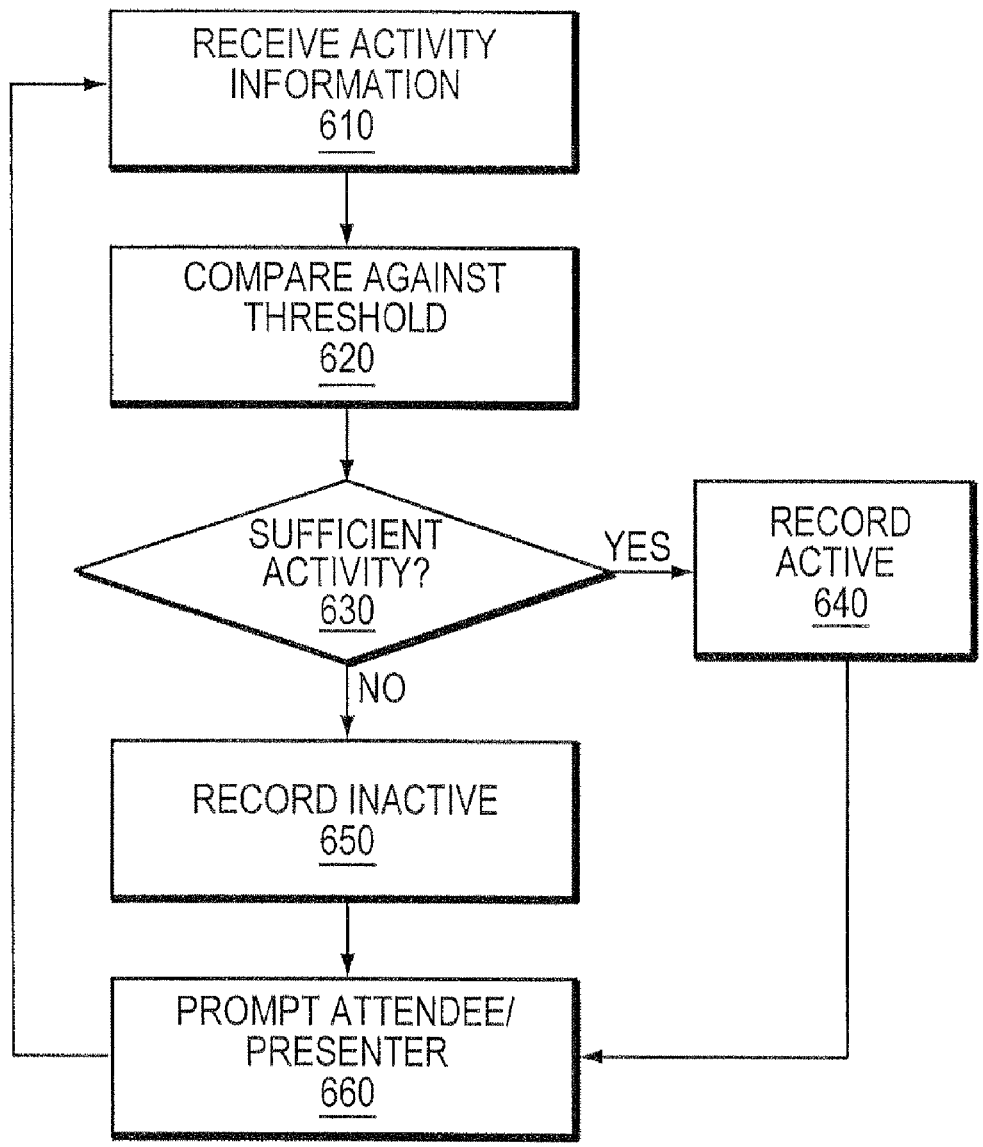
FIG. 6 is a flow diagram consistent with one embodiment of the methods and apparatuses for reporting based on attention of a user during a collaboration session.

The flow diagram in FIG. 6 illustrates determining levels of activity from devices participating in a collaboration session according to one embodiment of the invention.

In Block 610, activity information is received. In one embodiment, the activity information is recorded within FIG. 5.

In Block 620, the activity information associated with a device participating in the collaboration session is compared against a predetermined threshold. In one embodiment, the predetermined threshold includes parameters from the content detection module 310, the interface detection module 320, and the duration module 360. In another embodiment, the predetermined threshold is measured in terms of the parameter corresponding with the scoring module 370.

In one embodiment, the predetermined threshold is assigned to differentiate between devices that show indication that they are active during the collaboration session versus devices that show indication that they are inactive during the collaboration session.

In one embodiment the predetermined threshold is based on a cumulative score over the period of the collaboration session. In another embodiment, the predetermine threshold is based on a periodic score that is reset at particular intervals.

In Block 630, if the activity from a particular device participating in the collaboration session exceeds the predetermined threshold, then the activity associated with the particular device is considered active and recorded in the Block 640.

In Block 630, if the activity from a particular device participating in the collaboration session falls below the predetermined threshold, then the activity associated with the particular device is considered inactive and recorded in the Block 650.

In Block 660, the attendee device that falls below the predetermined threshold is notified. In one embodiment, the notification includes one of a buzzer sound from the attendee device, a visual indication on the attendee device, and the content that is the subject of the collaboration session being placed in the forefront. In another embodiment, the attendee device is notified by a pop-up window notifying the user of the attendee device that additional attention is requested.

In another embodiment, the presenter device is also notified when the attendee device falls below the predetermined threshold.

Figure 7:
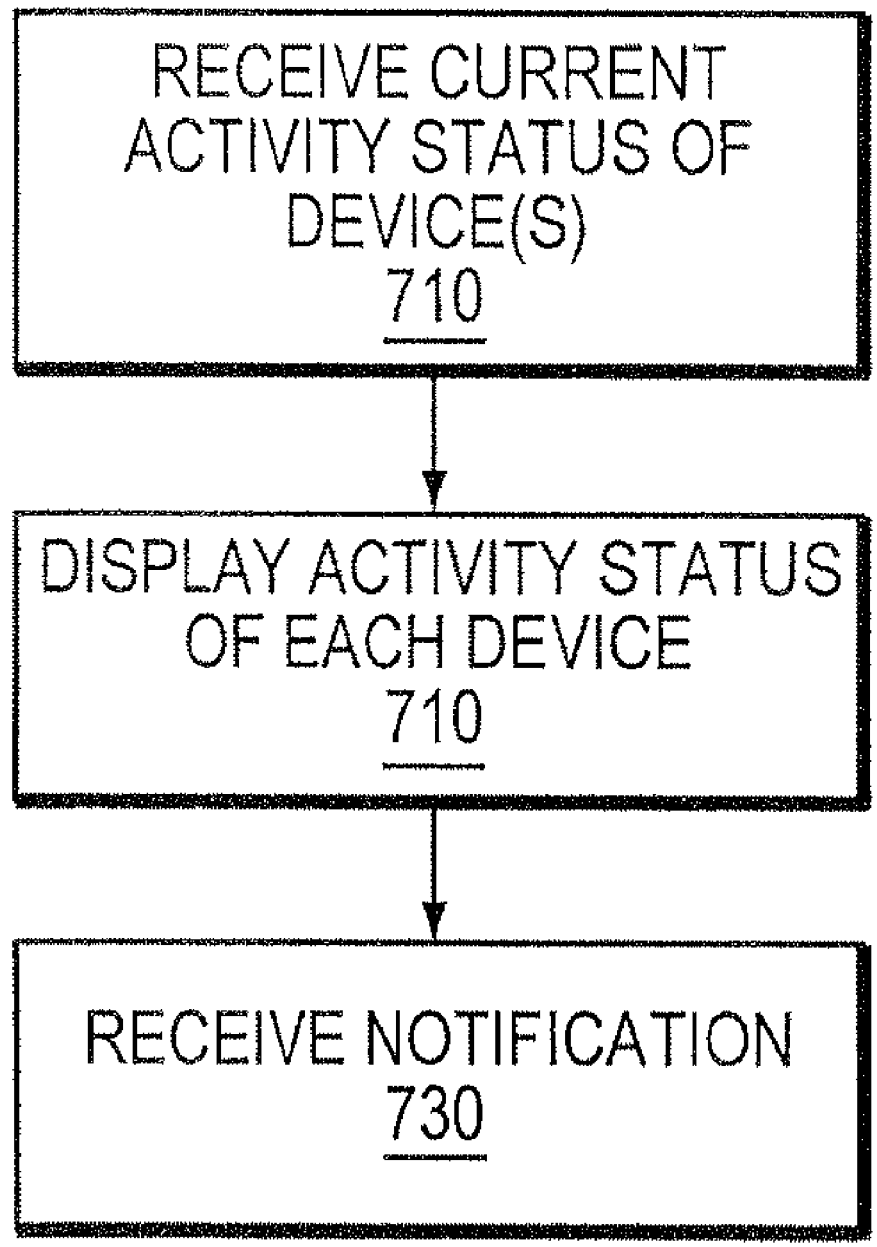
FIG. 7 is a flow diagram consistent with one embodiment of the methods and apparatuses for reporting based on attention of a user during a collaboration session.

The flow diagram in FIG. 7 illustrates displaying the status of the devices participating in a collaboration session according to one embodiment of the invention.

In Block 710, current activity status of each device participating in the collaboration session is received. In one embodiment, the current activity status is received during the collaboration session. In one embodiment, the current activity status of a device may be either active or inactive. In one embodiment, the determination of whether the device is either active or inactive depends on factors such as content detection, interface detection, and duration of the content and/or interface detection. An exemplary determination of the current activity status is found in FIG. 6.

In Block 720, the current activity status of each device participating in the collaboration session is displayed to one of the devices participating in the collaboration session. In one embodiment, the device that receives the displayed current activity status is the host or originator of the collaboration session. In another embodiment, the device that receives the displayed current activity status is the current presenter of the collaboration session; the presenter of the collaboration session may change multiple times during the collaboration session.

Figure 10:
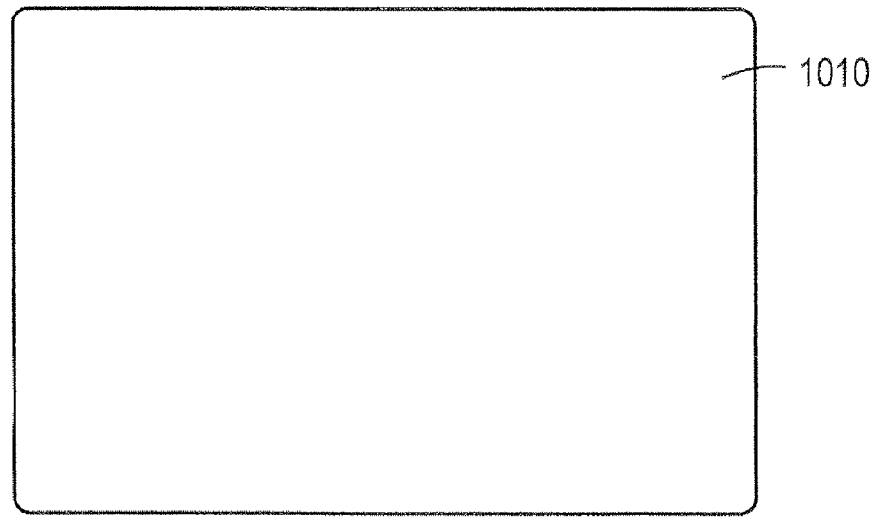
FIG. 10 illustrates an exemplary screen shot showing one embodiment of the methods and apparatuses for reporting based on attention of a user during a collaboration session.
Figure 10:
Figure 10:
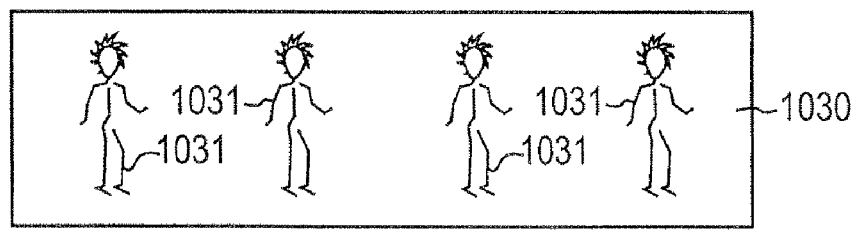

An exemplary screen shot illustrating a display of the current activity status for devices participating in the collaboration session is shown in FIG. 10.

In Block 730, notification regarding the current activity status is received by one of the devices participating in the collaboration session. In one embodiment, the notification indicates that a predetermined number of devices within the collaboration session that are inactive. In another embodiment, the notification indicates that a predetermined percentage of devices within the collaboration session that are inactive.

In one embodiment, the notification is presented to the device associated with current presenter in the collaboration session. In another embodiment, the notification is presented to the device associated with host or originator of the collaboration session.

In one instance, when a particular device associated with the current presenter receives a notification, then the current presenter is able to modify the presentation to other devices with the hope of increasing the number of devices that are actively participating in the collaboration session.

Figure 8:
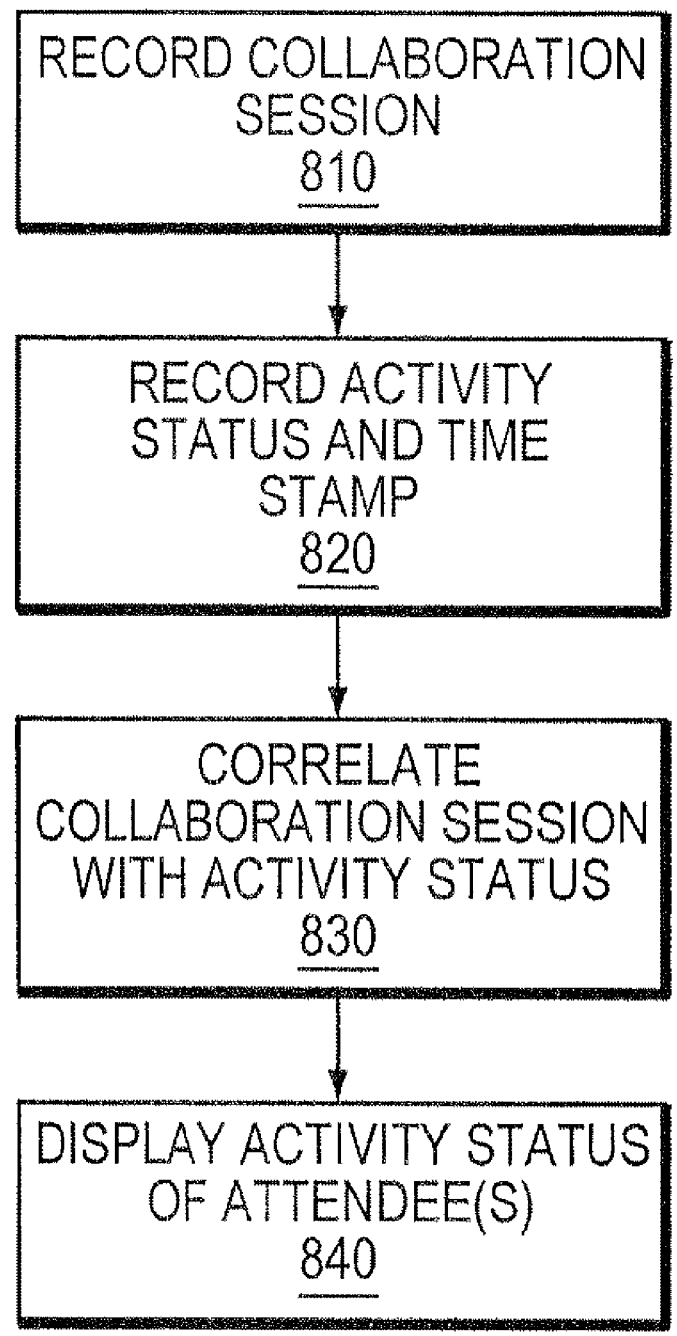
FIG. 8 is a flow diagram consistent with one embodiment of the methods and apparatuses for reporting based on attention of a user during a collaboration session.

The flow diagram in FIG. 8 illustrates displaying the status of the devices participating in a collaboration session according to one embodiment of the invention.

In Block 810, the collaboration session is recorded. In one embodiment, the comments made by various devices participating in the collaboration session as well as the content presented during the collaboration session is recorded. In one embodiment, a time is recorded simultaneously with the collaboration session. For example, a time stamp is recorded periodically as the collaboration session is also recorded. As an exemplary scenario, the time stamp periodically occurs every second. In one embodiment, the time stamp refers to the actual time such as 1:25:33 PM. In another embodiment, the time stamp is relative to the start time of the collaboration session.

In Block 820, the activity status and the time stamp corresponding to the activity status is recorded. In one embodiment, the activity status of each device participating in the collaboration session is recorded. An exemplary determination of the current activity status is found in FIG. 6.

In one embodiment, the activity status may change over the course of the collaboration session. The activity status for each device may be recorded at a predetermined interval. The predetermined interval may range for a fraction of a second to multiple seconds.

In Block 830, the activity status for each device at a given time is correlated to the collaboration session. In one embodiment, the time stamps corresponding to the activity status are matched with time stamps corresponding to the recorded collaboration session. For example, the activity status for device #3 at time t1 is matched to the content presented at the collaboration session at the same time t1.

In Block 840, the activity status and content presented at the collaboration session are displayed.

Figure 9:
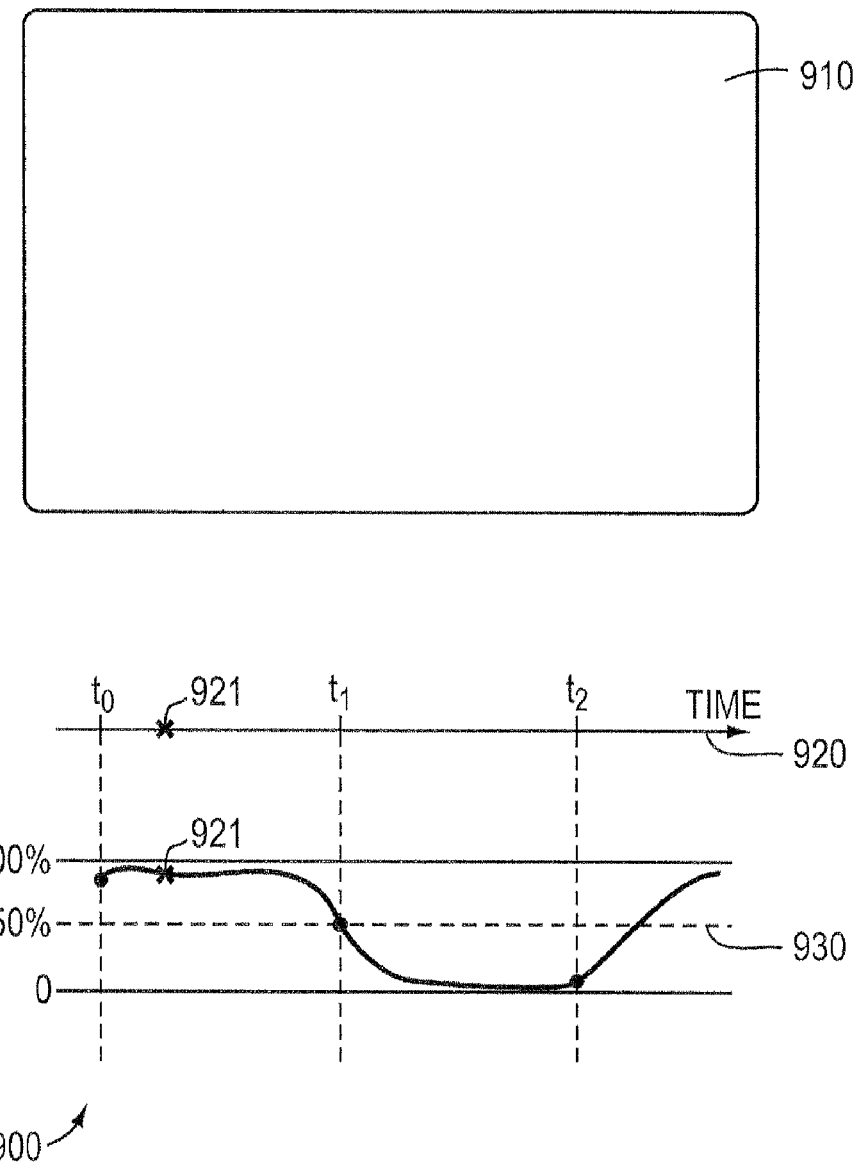
FIG. 9 illustrates an exemplary screen shot showing one embodiment of the methods and apparatuses for reporting based on attention of a user during a collaboration session.

An exemplary screen shot illustrating the display of the current activity status for devices participating in the collaboration session and the content presented at the collaboration session are shown in FIG. 9.

FIG. 9 illustrates an exemplary screen shot 900 that shows one embodiment of the methods and apparatuses for reporting based on attention of a user during a collaboration session. In one embodiment, the screen shot 900 includes a visual display area 910, a time line 920, and an activity display 930.

In one embodiment, the visual display area 910 displays content utilized during the collaboration session. In one embodiment, the content is textual, graphical, audio, and/or video. Further, the content may be annotations, conversations, and content presented during the collaboration session.

In one embodiment, the time line 920 graphically displays a timing diagram that shows the duration of at least a portion of the collaboration session. In one embodiment, different times are shown on the time line 920 such as t0, t1, and t2. For example, t0 may represent the beginning of the collaboration session, and t2 may represent the termination of the collaboration session. In one embodiment, a marker 921 shows a current time location of the collaboration session. For example, the marker 921 associates the content displayed within the graphical display area 910 with a location of the collaboration session.

In one embodiment, the activity display 930 graphically illustrates the percentage of devices that are actively participating in the collaboration session. In this example, gradations of 100%, 50%, and 0% are shown. However, any number of intervals may be utilized without departing from the spirit or scope of the invention. In one embodiment, at times t0, t1, and t2, the activity display 930 highlights those participation percentages as milestone time periods. In one embodiment, the marker 921 shows the percentage of device participation at a particular time.

In another embodiment, the activity display 930 graphically illustrates the actual number of devices that are actively participating in the collaboration session.

FIG. 10 illustrates an exemplary screen shot 1000 that shows one embodiment of the methods and apparatuses for reporting based on attention of, a user during a collaboration session. In one embodiment, the screen shot 1000 includes a graphical display area 1010, a time line 1020, and an activity display 1030.

In one embodiment, the visual display area 1010 displays content utilized during the collaboration session. In one embodiment, the content is textual, graphical, audio, and/or video. Further, the content may be annotations, conversations, and content presented during the collaboration session.

In one embodiment, the time line 1020 graphically displays a timing diagram that shows the duration of at least a portion of the collaboration session.

In one embodiment, different times are shown on the time line 1020 such as t0, t1, and t2. For example, t0 may represent the beginning of the collaboration session, and t2 may represent the termination of the collaboration session. In one embodiment, a marker 1021 shows a current time location of the collaboration session. For example, the marker 1021 associates the content displayed within the visual display area 1010 with a location of the collaboration session.

In one embodiment, the activity display 1030 graphically identifies devices that are actively participating in the collaboration session. In this example, pictorial representations 1031 of each device are shown. In one embodiment, a different color of the pictorial representations 1031 represents whether the device is actively participating or inactive. In another embodiment, a highlighted pictorial representation 1031 represents that the device is actively participating in the collaboration session. However, any number of pictorial and/or textual representations may be utilized without departing from the spirit or scope of the invention.

In one embodiment, at times t0, t1, and t2, the activity display 1030 highlights those devices that are actively participating as milestone time periods. In one embodiment, the marker 1021 shows the devices that are actively participating at a particular time.

In another embodiment, the activity display 930 graphically illustrates the actual number of devices that are actively participating in the collaboration session.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   displaying content that corresponds with a plurality of times during a collaboration session;
   identifying a plurality of attendee devices participating in the collaboration session at the plurality of times;
   determining an attention status of each attendee device to the content of the collaboration session at each of the plurality of times by monitoring at least one of a size of the content of the collaboration session on the display of the attendee device at each of the plurality of times, or a location of the content of the collaboration session on the display of the attendee device, at each of the plurality of times, wherein the at least one of a size of the content of the collaboration session on the display of the attendee device at each of the plurality of times, or a location of the content of the collaboration session on the display of the attendee device at each of the plurality of times, are used as an indication of attention to the content;
   recording the collaborative session;
   correlating the attention status of each attendee device at each of the plurality of times with content that was displayed during the collaboration session at each of the plurality of times; and
   displaying, on a participant device, the attention status of the plurality of attendee devices at each of the plurality of times together with content from the recorded collaborative session that was displayed at each of the plurality of times.

2. The method according to claim 1 wherein the attention status is one of an active status and an inactive status.

3. The method according to claim 1 wherein the content and the attention status are displayed simultaneously.

4. The method according to claim 1 further comprising detecting an attribute for each of the attendee devices during the collaboration session, the attribute indicating attention of a user of the attendee device to the content, and wherein the attribute is utilized to determine the attention status.

5. The method according to claim 4 further comprising scoring the attribute to determine the attention status of each of the plurality of attendee devices.

6. The method according to claim 4 further comprising storing the attention status and the attribute for each of the plurality of attendee devices within a record associated with each attendee device.

7. The method according to claim 1 wherein the displaying the attention status further comprises displaying to a presenter device an aggregate representation of the attention status of the plurality of attendee devices.

8. The method according to claim 1 further comprising updating the content after a particular time of the plurality of times.

9. The method according to claim 1 further comprising updating the attention status of the plurality of attendee devices after a particular time of the plurality of times.

10. The method according to claim 1 wherein the displaying the attention status further comprises displaying to a presenter device the attention status of each of the plurality of attendee devices individually.

11. A system, comprising:
   a processor; and
   a memory storing instructions for execution on a processor, the instructions including instructions for,
   a content detection module configured to detect content utilized by an attendee device at a plurality of times during a collaboration session,
   a scoring module configured to generate an attention status associated with the attendee device with respect to the content of the collaboration session, by monitoring an attribute for the attendee device at each of the plurality of times during the collaboration session, wherein the attribute at each of the plurality of times is at least one of a size of the content of the collaboration session on the display of the attendee device that indicates attention to the content of the collaboration session, or a location of the content of the collaboration session on the display of the attendee device that indicates attention to the content of the collaboration session,
   a storage module configured to store the attention status and the content utilized by the attendee device at each of the plurality of times,
   a record module configured to correlate the attention status of the attendee device at each of the plurality of times with content utilized by the attendee device at each of the plurality of times; and
   an interface module configured to display the stored content and the attention status corresponding to the attendee device at each of the plurality of times.

12. The system according to claim 11 wherein the scoring module determines whether the attendee device is in one of an active state and an inactive state.

13. The system according to claim 12 wherein the interface module notifies the presenter device when the attendee device is in the inactive state.

14. The system according to claim 12 wherein the interface module notifies the attendee device when the attendee device is in the inactive state.

15. A non-transitory computer readable medium having computer-executable instructions for performing a method comprising:
   displaying content that corresponds to a plurality of times during a collaboration session;
   identifying an attendee device participating in the collaboration session at the plurality of times;
   determining an attention status for the attendee device to the content of the collaboration session at each of the plurality of times by monitoring at least one of a size of the content of the collaboration session on the display of the attendee device at each of the plurality of times, a location of the content of the collaboration session on the display of the attendee device at each of the plurality of times, or a priority order of the content of the collaboration session on a display of the attendee device relative to other content being displayed on the display of the attendee device at each of the plurality of times, wherein the at least one of a size of the content of the collaboration session on the display of the attendee device at each of the plurality of times, a location of the content of the collaboration session on the display of the attendee device at each of the plurality of times, or a priority order of the content of the collaboration session on a display of the attendee device relative to other content being displayed on the display of the attendee device at each of the plurality of times, are used as an indication of attention to the content;
   recording the collaborative session;
   correlating the attention status of the attendee device at each of the plurality of times with content that was displayed during the collaboration session at each of the plurality of times; and displaying the attention status and the content from the recorded collaborative session corresponding to each of the plurality of times to a presenter device.

16. The computer readable medium according to claim 15 further comprising instructions for detecting an attribute for the attendee device during the collaboration session, the attribute indicating attention of a user of the attendee device to the content, and wherein the attribute is utilized to determine the attention status.

17. The computer readable medium according to claim 16 further comprising instructions for storing the attention status and the attribute for the attendee device within a record associated with the attendee device.

18. A method comprising:
    displaying content at a plurality of different times during a collaboration session;
    identifying a plurality of attendee devices participating in the collaboration session at the plurality of different times;
    determining an attention status of each attendee device to the content of the collaboration session at each of the plurality of times by monitoring at least one of
        a size of the content of the collaboration session on the display of the attendee device, or
        a location of the content of the collaboration session on the display of the attendee device,
    at each of the plurality of times during the collaboration session, wherein the at least one of the size of the content of the collaboration session on the display of the attendee device, or the location of the content of the collaboration session on the display of the attendee device, at each of the plurality of times during the collaboration session, are used as an indication of attention to the content;
    correlating the attention status of each attendee device at each of the plurality of different times with content displayed during the collaboration session at each of the plurality of different times; and
    displaying simultaneously, on a participant device, an indication of the attention status of the plurality of attendee devices at one or more of the plurality of different times and the content being displayed in the collaboration session at the one or more of the plurality of times.

* * * * *